(12) United States Patent
Nooner et al.

(10) Patent No.: US 10,056,745 B2
(45) Date of Patent: Aug. 21, 2018

(54) ELECTRICAL CORD CONNECTION COVERING TECHNIQUES

(71) Applicant: MIDWEST INNOVATIVE PRODUCTS, LLC, Frankfort, IL (US)

(72) Inventors: Bryan Nooner, Frankfort, IL (US); Robert B. Zajeski, Jr., Homer Glen, IL (US); Benjamin Lynch Zajeski, Homer Glen, IL (US)

(73) Assignee: MIDWEST INNOVATIVE PRODUCTS, LLC, Frankfort, IL (US)

( * ) Notice: Subject to any disclaimer, the term of this patent is extended or adjusted under 35 U.S.C. 154(b) by 0 days.

(21) Appl. No.: 15/585,379

(22) Filed: May 3, 2017

(65) Prior Publication Data
US 2017/0324229 A1 Nov. 9, 2017

Related U.S. Application Data

(60) Provisional application No. 62/331,133, filed on May 3, 2016.

(51) Int. Cl.
*H02G 3/04* (2006.01)

(52) U.S. Cl.
CPC ......... *H02G 3/0406* (2013.01); *H02G 3/0462* (2013.01)

(58) Field of Classification Search
CPC ........................... H02G 3/0406; H02G 3/0462
(Continued)

(56) References Cited

U.S. PATENT DOCUMENTS 3,344,393 A * 9/1967 Hendee .............. H01R 13/6392
439/367
4,643,505 A * 2/1987 House ................ H01R 13/6392
174/92

(Continued)

FOREIGN PATENT DOCUMENTS

WO 03/001631 A1 1/2003

OTHER PUBLICATIONS

Notification of Transmittal of the International Search Report and the Written Opinion of the International Searching Authority, or the Declaration, in Application No. PCT/US17/30807, dated Nov. 13, 2017 (9 pages).

*Primary Examiner* — Andargie M Aychillhum
*Assistant Examiner* — Michael F McAllister
(74) *Attorney, Agent, or Firm* — McAndrews, Held & Malloy, Ltd.

(57) ABSTRACT

An apparatus is designed to protect a connection between a plug of a first electrical cord and a socket of a second electrical cord from moisture. The apparatus consists of a first housing portion and a second housing portion that, when mated, form an interior region, a first aperture configured to receive the first electrical cord, and a second aperture configured to receive the second electrical cord. Four cross-wise portions are located in the interior region. The first and second cross-wise portions are attached to the first housing portion and are positioned proximate the first and second apertures, respectively. The third and fourth cross-wise portions are attached to the second housing portion and are positioned proximate the first and second apertures, respectively. When the housing portions are mated, the first cross-wise portion abuts the third cross-wise portion and the second cross-wise portion abuts the fourth cross-wise portion.

22 Claims, 9 Drawing Sheets

(58) Field of Classification Search
USPC ......... 174/84 R, 88 R, 92, 93; 439/367, 314, 439/369
See application file for complete search history.

(56) References Cited

U.S. PATENT DOCUMENTS

| | | | | |
|---|---|---|---|---|
| 5,135,409 | A * | 8/1992 | Thompson | H01R 13/6392 |
| | | | | 439/367 |
| 5,217,387 | A * | 6/1993 | Hull | H01R 13/6392 |
| | | | | 439/367 |
| 5,306,176 | A * | 4/1994 | Coffey | H01R 13/6392 |
| | | | | 439/367 |
| 5,674,089 | A | 10/1997 | Sampson | |
| 5,844,171 | A * | 12/1998 | Fitzgerald | H02G 15/113 |
| | | | | 174/92 |
| 6,280,235 | B1 * | 8/2001 | Radliff | H01R 13/501 |
| | | | | 439/456 |
| 7,465,182 | B1 | 12/2008 | McDonald | |
| 7,553,181 | B1 * | 6/2009 | Van Dalinda, III | H01R 13/6392 |
| | | | | 174/92 |
| D607,412 | S * | 1/2010 | Palomaki | D13/149 |
| 8,408,929 | B2 * | 4/2013 | Solon | H01R 13/639 |
| | | | | 439/301 |
| 8,870,587 | B2 | 10/2014 | Nooner | |
| 2011/0275233 | A1 | 11/2011 | Benear | |
| 2013/0165002 | A1 * | 6/2013 | Nooner | H01R 13/5208 |
| | | | | 439/892 |

\* cited by examiner

ELECTRICAL CORD CONNECTION COVERING TECHNIQUES

CROSS REFERENCE TO RELATED APPLICATIONS

This application claims priority to U.S. Pat. Appl. Ser. No. 62/331,133, filed on May 3, 2016, which is herein incorporated by reference in its entirety.

BACKGROUND

Generally speaking, this application discloses techniques relating to weatherproofing plug connections for electrical cords, such as extension cords or decorative lighting cords.

It may be desirable to keep moisture from interfering with electrical cord plug connections. If such a connection is corrupted by moisture, short circuits to ground may occur causing a potentially dangerous condition or causing circuit breakers, fuses, or ground-fault interrupt circuits to prevent the flow of current through the electrical cord. For example, outdoor holiday lighting often involves the use of multiple plug connections in an environment with unfavorable environmental conditions (for example, snow, melting snow, fog, sleet, freezing rain, rain, extreme temperatures, salt, etc.). Thus, it is desirable to have an apparatus that covers a plug connection to prevent corruption of the plug connection by moisture.

SUMMARY

According to certain inventive techniques, an electrical cord connection covering apparatus for covering a connection of a first electrical cord, including a plug and a cable with a second electrical cord including a socket and a cable. The electrical cord connection covering apparatus may include: a first housing portion including an interior surface, an exterior surface, a first end, and a second end; and a second housing portion configured to mate with the first housing portion and including an interior surface, an exterior surface, a first end, and a second end. When the first housing portion and second housing portion are mated, they may form a hollow interior region, a first aperture configured to receive the first electrical cord, and a second aperture configured to receive the second electrical cord.

The electrical cord connection covering apparatus may also include: a first at least one cross-wise portion attached to the interior surface of the first housing portion and proximate the first end of the first housing portion; a second at least one cross-wise portion attached to the interior surface of the first housing portion and proximate the second end of the first housing portion; a third at least one cross-wise portion attached to the interior surface of the second housing portion and proximate the first end of the second housing portion; and a fourth at least one cross-wise portion attached to the interior surface of the second housing portion and proximate the second end of the second housing portion.

When the first housing portion is mated with the second housing portion, each of the first at least one cross-wise portion may be offset from the first end of the first housing portion along a primary axial dimension; each of the second at least one cross-wise portion may be offset from the second end of the first housing portion along the primary axial dimension; each of the third at least one cross-wise portion may be offset from the first end of the second housing portion along the primary axial dimension; and each of the fourth at least one cross-wise portion may be offset from the second end of the second housing portion along the primary axial dimension.

The electrical cord connection covering apparatus of claim 1 may additionally include an upper region of the first at least one cross-wise portion that is offset from an upper region of the third at least one cross-wise portion along a primary axial dimension; and an upper region of the second at least one cross-wise portion that is offset from an upper region of the fourth at least one cross-wise portion along the primary axial dimension.

When the first housing portion is mated with the second housing portion, the first at least one cross-wise portion may abut the third at least one cross-wise portion; and the second at least one cross-wise portion may abut the fourth at least one cross-wise portion. Alternatively, a lateral side of the first at least one cross-wise portion may abut a lateral side of the third at least one cross-wise portion; and a lateral side of the second at least one cross-wise portion may abut a lateral side of the fourth at least one cross-wise portion.

Additionally, when the first housing portion is mated with the second housing portion, the third at least one cross-wise portion may be deflected laterally by the first at least one cross-wise portion; and the fourth at least one cross-wise portion may be deflected laterally by the second at least one cross-wise portion. Alternatively, when the first housing portion is mated with the second housing portion, the first at least one cross-wise portion and the third at least one cross-wise portion may be deflected laterally by each other; and the second at least one cross-wise portion and the fourth at least one cross-wise portion may be deflected laterally by each other.

The electrical cord connection covering apparatus may also include an inner one of the first at least one cross-wise portion and an inner one of the second at least one cross-wise portion, which are spaced apart from each other to prevent the plug of the first electrical cord from separating from the socket of the second electrical cord when the plug and socket are engaged. The spacing between the inner one of the first at least one cross-wise portion and the inner one of the second at least one cross-wise portion may be between 4.5 and 4.75 inches. Alternatively, the spacing between the inner one of the first at least one cross-wise portion and the inner one of the second at least one cross-wise portion may be 4.75 inches.

Each of the first at least one cross-wise portion and third at least one cross-wise portion may comprise a recess located to accommodate a portion of the cable of the first electrical cord; and each of the second at least one cross-wise portion and fourth at least one cross-wise portion may comprise a recess located to accommodate a portion of the cable of the second electrical cord. Moreover, each of the first at least one cross-wise portion, second at least one cross-wise portion, third at least one cross-wise portion, and fourth at least one cross-wise portion may be tapered inwardly with respect to the interior surface of the first and second housing portions, such that a lateral thickness of a given cross-wise portion is greater at a lower region of said cross-wise portion than at an upper region of said cross-wise portion.

The electrical cord connection covering apparatus may also include: a raised portion located along a rim of the first housing portion; a recessed portion located along a rim of the second housing portion. The raised portion and the recessed portion engage with each other when the first housing portion is mated to the second housing portion. The first housing portion may be connected to the second housing portion by a living hinge.

The electrical cord covering apparatus may also include: at least one recessed portion in the exterior surface of the first housing portion; at least one locking portion extending from the exterior surface the second housing portion. The at least one locking portion may engage with the at least one recessed portion when the first housing portion is mated to the second portion. The at least one locking portion may be connected to the second housing portion by a corresponding at least one living hinge The first housing portion and second housing portion may comprise a housing material; and each of the first at least one cross-wise portion, second at least one cross-wise portion, third at least one cross-wise portion, and fourth at least one cross-wise portion may comprise a sealing material. The sealing material may be more compressible than the housing material and the sealing material may be more elastic than the housing material.

According to certain inventive techniques, an electrical cord connection covering apparatus for covering a connection of a first electrical cord including a plug and a cable with a second electrical cord including a socket and a cable. The electrical cord connection covering apparatus may include a first housing portion; a second housing portion that mates with the first housing portion; at least one cross-wise portion attached to an interior surface the first housing portion; and at least one opposing cross-wise portion attached to an interior surface of the second housing portion. A lateral side of the at least one cross-wise portion may abut a lateral side of the at least one opposing cross-wise portion when the first housing portion is mated with the second housing portion.

The at least one cross-wise portion and the opposing at least one cross-wise portion may each be tapered inwardly with respect to the interior surface of the first and second housing portions, such that a lateral thickness of a given cross-wise portion is greater at a lower region of said cross-wise portion than at an upper region of said cross-wise portion. Additionally, the at least one cross-wise portion and the opposing at least one cross-wise portion may each comprise a recess sized to accommodate a portion of the cable of the first electrical cord.

Figure 1:
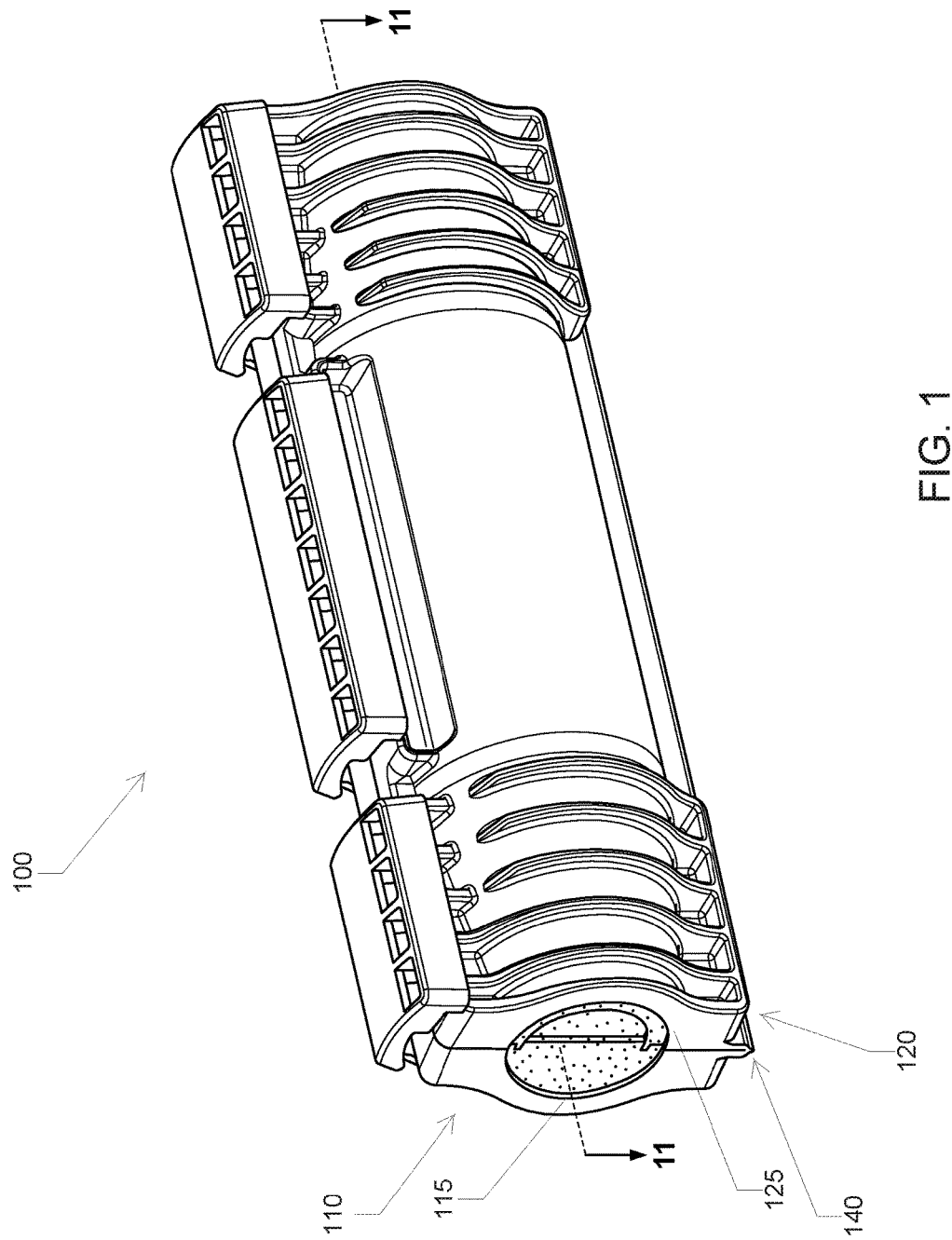
FIG. 1 illustrates a perspective view of an electrical connection covering apparatus in a closed position, according to certain inventive techniques.
Figure 3:
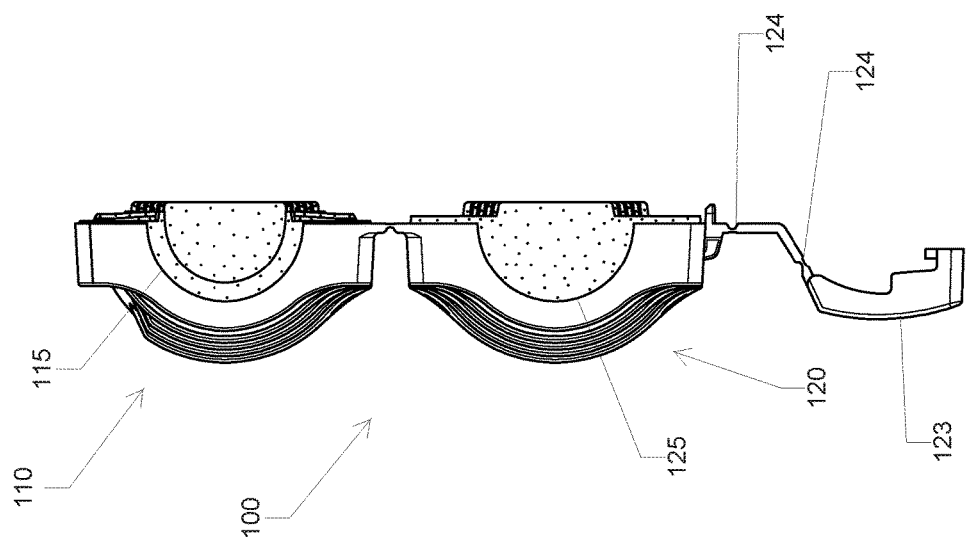
FIG. 3 illustrates a left-side view of the electrical connection covering apparatus in the open position.
Figure 2:
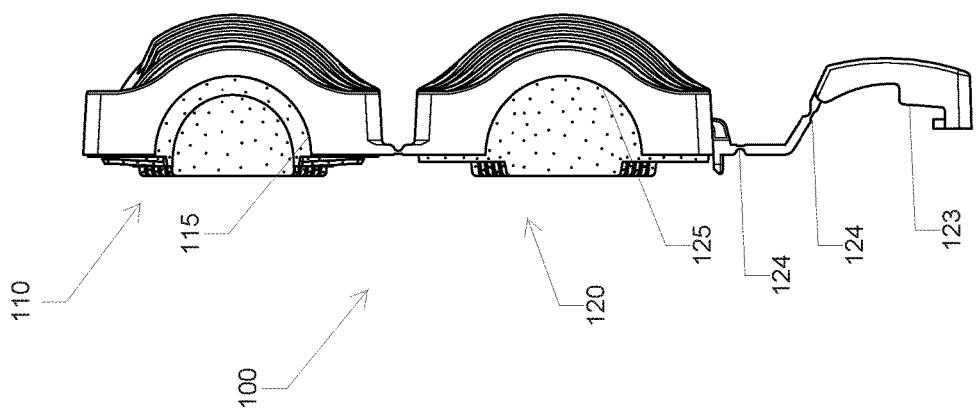
FIG. 2 illustrates a right-side view of the electrical connection covering apparatus in the open position.

The foregoing summary, as well as the following detailed description of certain techniques of the present invention, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

| Parts listing: | |
|---|---|
| Number | Description |
| 100 | Apparatus |
| 110 | First housing portion |
| 111 | First sealing portion |
| 112 | Second sealing portion |
| 113 | First locking feature |
| 115 | First recess |
| 120 | Second housing portion |
| 121 | Third sealing portion |
| 122 | Fourth sealing portion |
| 123 | Second locking feature |
| 124 | Locking feature hinge |
| 125 | Second recess |
| 131 | First cross-wise portion(s) |
| 131a | Outer first cross-wise portion |
| 131b | Inner first cross-wise portion |
| 132 | Second cross-wise portion(s) |
| 132a | Outer second cross-wise portion |
| 132b | Inner second cross-wise portion |
| 133 | Third cross-wise portion(s) |
| 133a | Outer third cross-wise portion |
| 133b | Inner third cross-wise portion |
| 134 | Fourth cross-wise portion(s) |
| 134a | Outer fourth cross-wise portion |
| 134b | Inner fourth cross-wise portion |
| 135 | Raised sealing portion |
| 136 | Recessed sealing portion |
| 138 | Cross-wise portion recess |
| 139 | Recess |
| 140 | Hinge |
| 141 | First outer flap |
| 142 | Second outer flap |
| 143 | Third outer flap |
| 144 | Fourth outer flap |
| 151 | First inner flap |
| 152 | Second inner flap |
| 153 | Third inner flap |
| 154 | Fourth inner flap |
| 201 | Internal material |
| 202 | Housing material |

Figure 9:
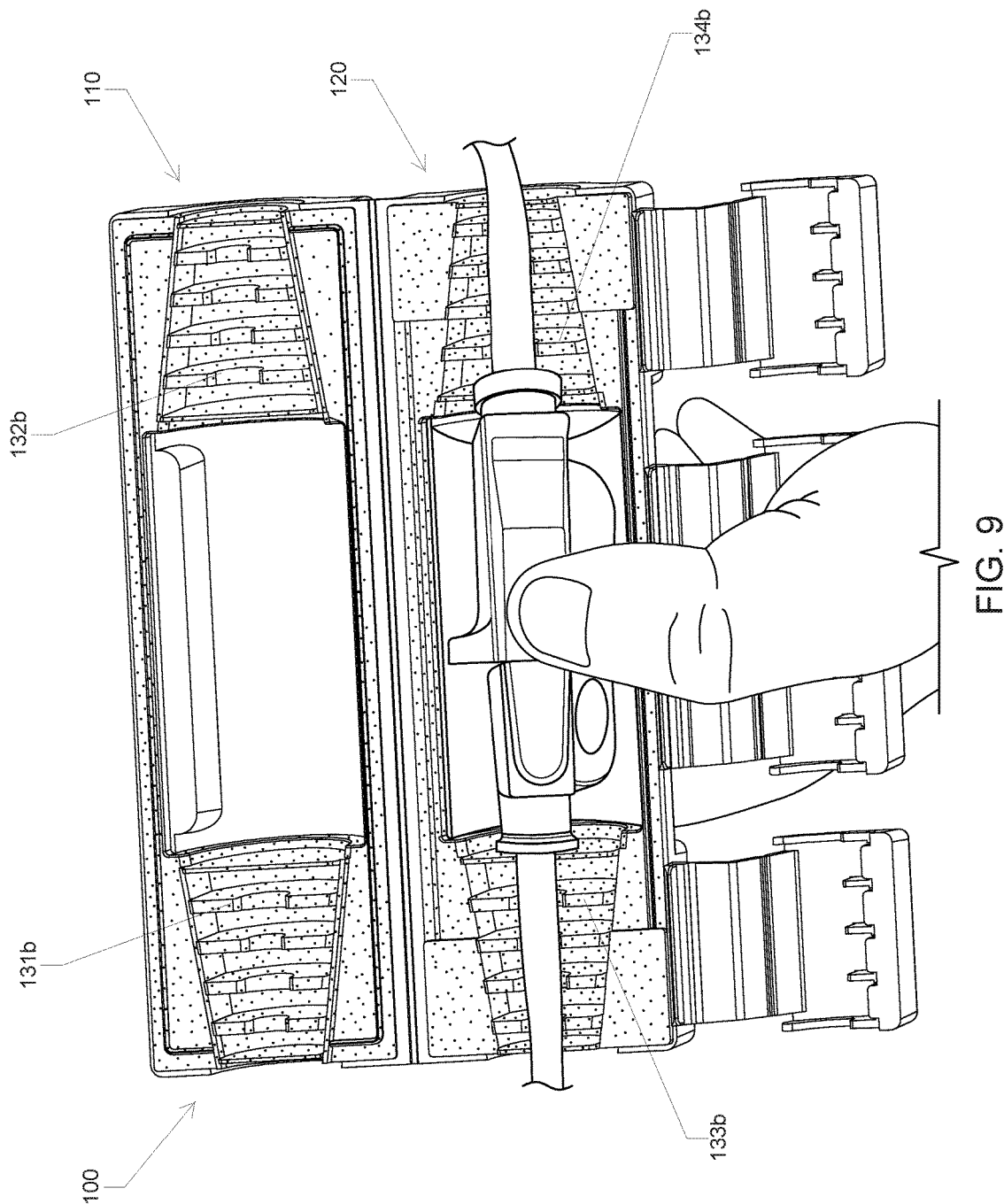
FIG. 9 illustrates a perspective view of the electrical connection covering apparatus in the open position with a portion of a first electrical cord and a portion of a second electrical cord.
Figure 10:
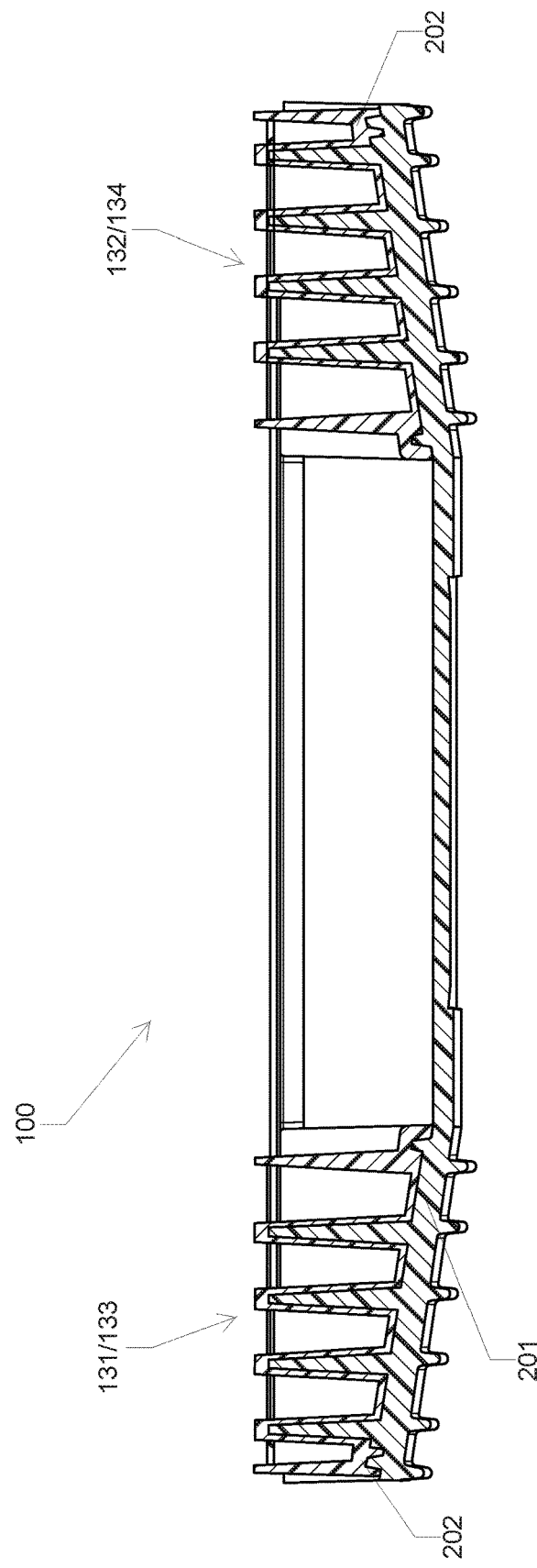
FIG. 10 illustrates a cross-sectional view of the electrical connection covering apparatus taken along the line 10-10 in FIG. 5.
Figure 11:
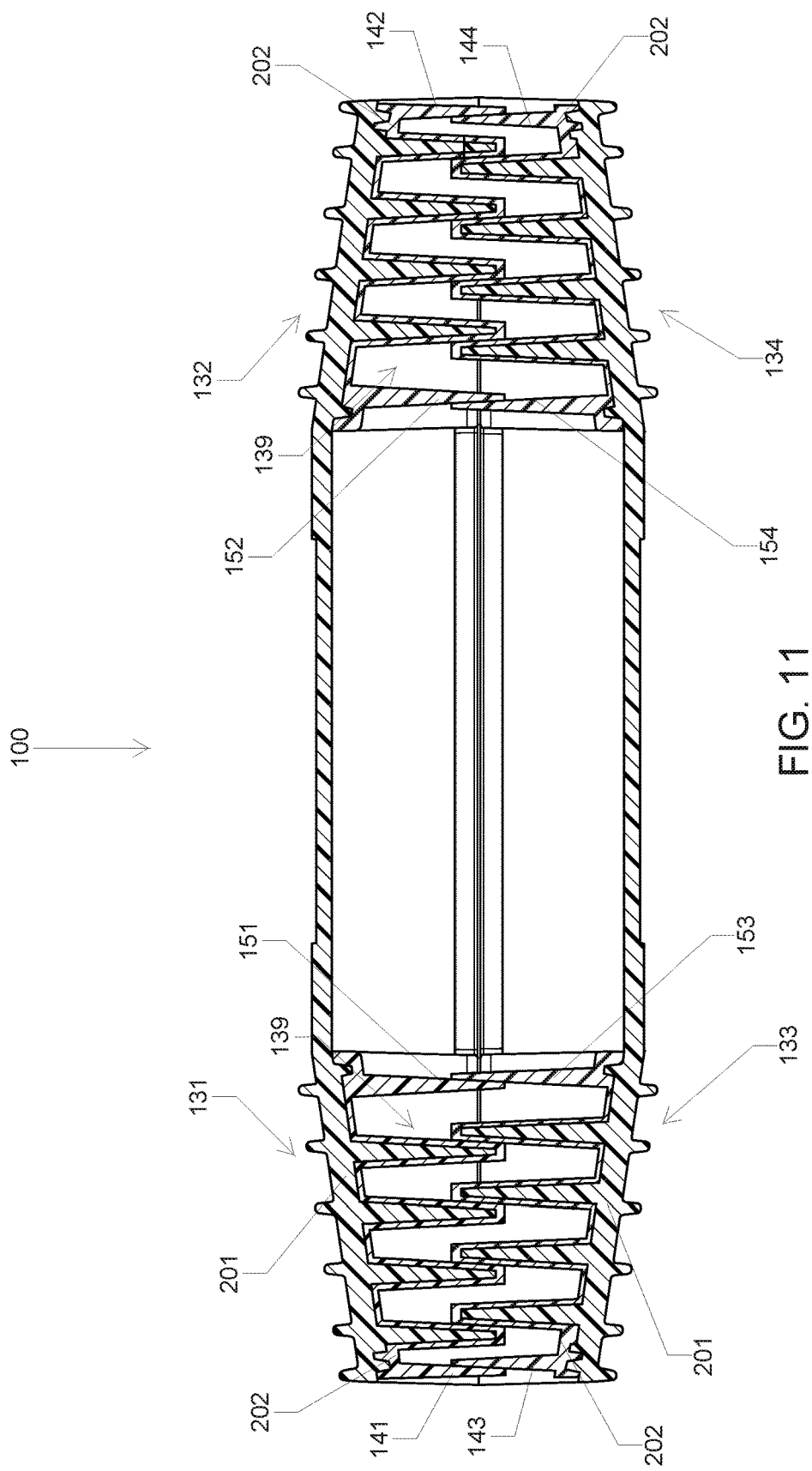
FIG. 11 illustrates a cross-sectional view of the electrical connection covering apparatus taken along the line 11-11 in FIG. 1.

FIGS. 1-8 show different views an apparatus 100 for covering an electrical connection between two cords, according to certain inventive techniques. FIG. 1 shows the apparatus 100 in a closed position and FIGS. 2-8 show different views of the apparatus 100 in an open position. FIG. 9 also shows the apparatus 100 in an open position with connected electrical cords. FIGS. 10 and 11 show cross-sectional views of the apparatus 100.

The apparatus 100 is intended to protect a plug/socket connection between electrical cords (e.g., extension cords, Christmas lights, etc.). The apparatus 100 may include two housing portions 110, 120 that can be opened and closed. For example, the housing portions 110, 120 may be clamshell parts and they may be connected by a hinge 140 (such as a living hinge). When the apparatus 100 is in an open position, a plug/socket connection between electrical cords may be positioned as shown in FIG. 9. The apparatus 100 may be placed in a closed position, or mated, by closing housing portions 110, 120 to form an enclosure that protects the connection from undesirable substances (e.g., water or salt).

There may be at least two types of seals in the apparatus 100. The first type of seal may be around the edges of each housing portion 110, 120. The second type of seal may be proximate the apertures in the ends (along the primary axial dimension) of the apparatus 100, where the cables of the cords enter and exit the enclosure. The inventive techniques disclosed herein create effective seals to protect the plug connection.

The housing portions 110, 120 may be made of, or include a material such as plastic (e.g., polyethylene, polypropylene, ABS, polycarbonate, nylon, or the like). The material may be substantially rigid, and may have a relatively low compressibility and elasticity, such as those defined by the material data sheets available for the above-referenced materials.

The material that may form the seals or is included in the seals (and cross-wise portion(s) 131, 132, 133, 134 and/or outer flaps 141, 142, 143, 144 and/or inner flaps 151, 152, 153, 154 discussed below) may be a thermoplastic elastomer. Other options could include silicone, rubber, ballistic gel, or the like. The seal material(s) may be more compressible and more elastic than the aforementioned housing material.

The housing portions 110, 120, when mated or engaged, may form an inner hollow region that may be generally tube-shaped and may have a maximum radius. Each side of the tube may have ends (e.g., substantially flat). At these ends, there may be apertures where cables of the cords enter/exit the central region formed by the housing portions 110, 120 in the closed position. As will be discussed, cross-wise portion(s) 131, 132, 133, 134 and/or outer flaps 141, 142, 143, 144 and/or inner flaps 151, 152, 153, 154 discussed below may be employed to make seals around the cords at or proximate these apertures, thereby inhibiting the penetration of contaminants (e.g., water or moisture) into the inner hollow region of the enclosure.

For reference, each housing portion 110, 120 may have an interior surface that faces the interior hollow region of the enclosure and an exterior surface that faces outwardly from the enclosure. Housing portion 110, 120 may have a center longitudinal axis (not shown), that runs the primary (longer) length of the apparatus 100, where a primary axial dimension runs parallel to, or along the center longitudinal axis. At each end of the housing portion 110 (e.g., right-side end and left-side end), there may be a recess 115. Each recess 115 may be arcuate. Similarly, at each end of the housing portion 120 (e.g., right-side end and left-side end), there may be a recess 125. Each recess 125 may be arcuate. When the housing portions 110, 120 are mated or engaged, the recesses 115, 125 together may form apertures in the ends of the apparatus 100. These apertures may be the ones through which the cables enter/exit the interior hollow region of the apparatus 100.

Figure 4:
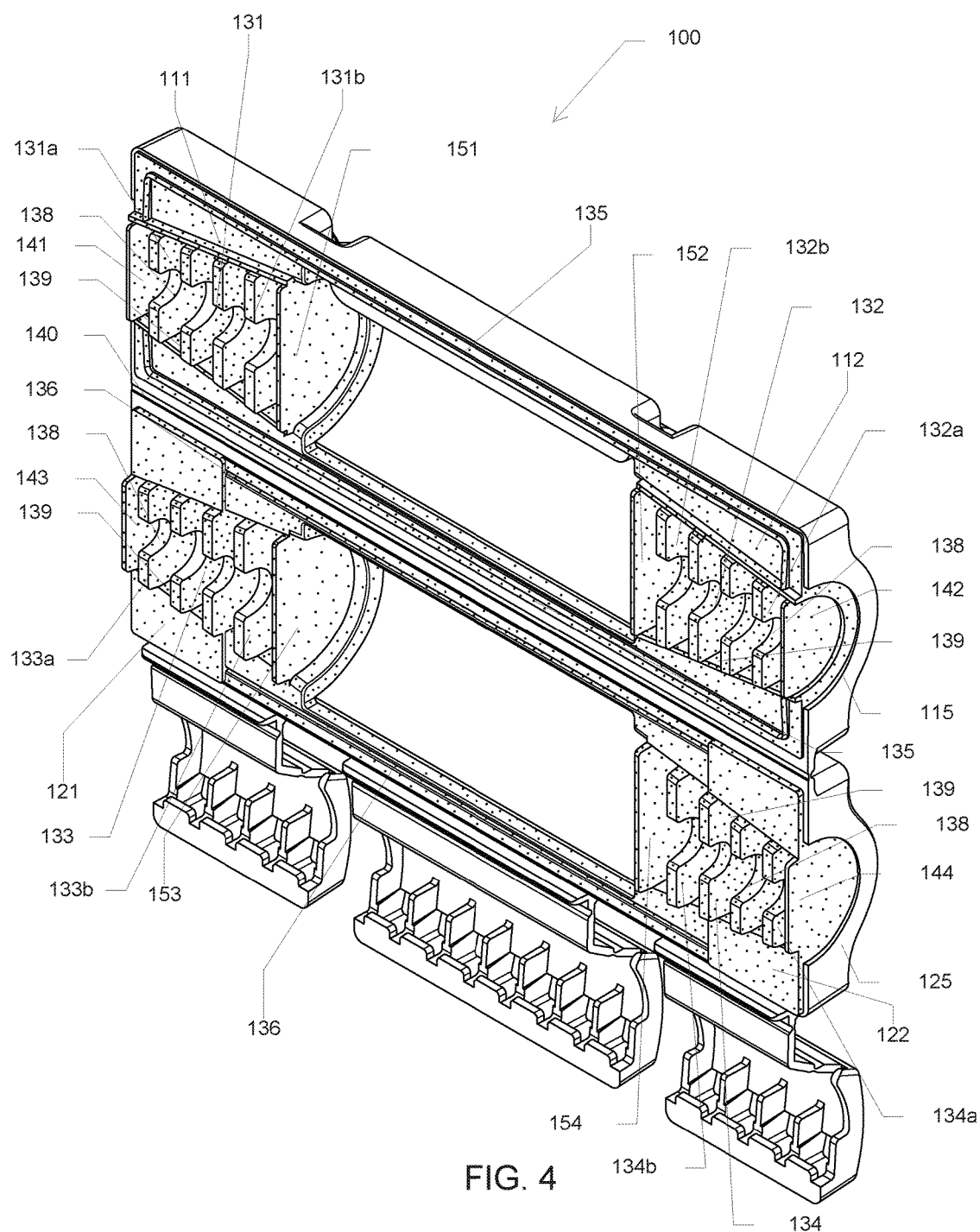
FIG. 4 illustrates a perspective view of the electrical connection covering apparatus in an open position.
Figure 5:
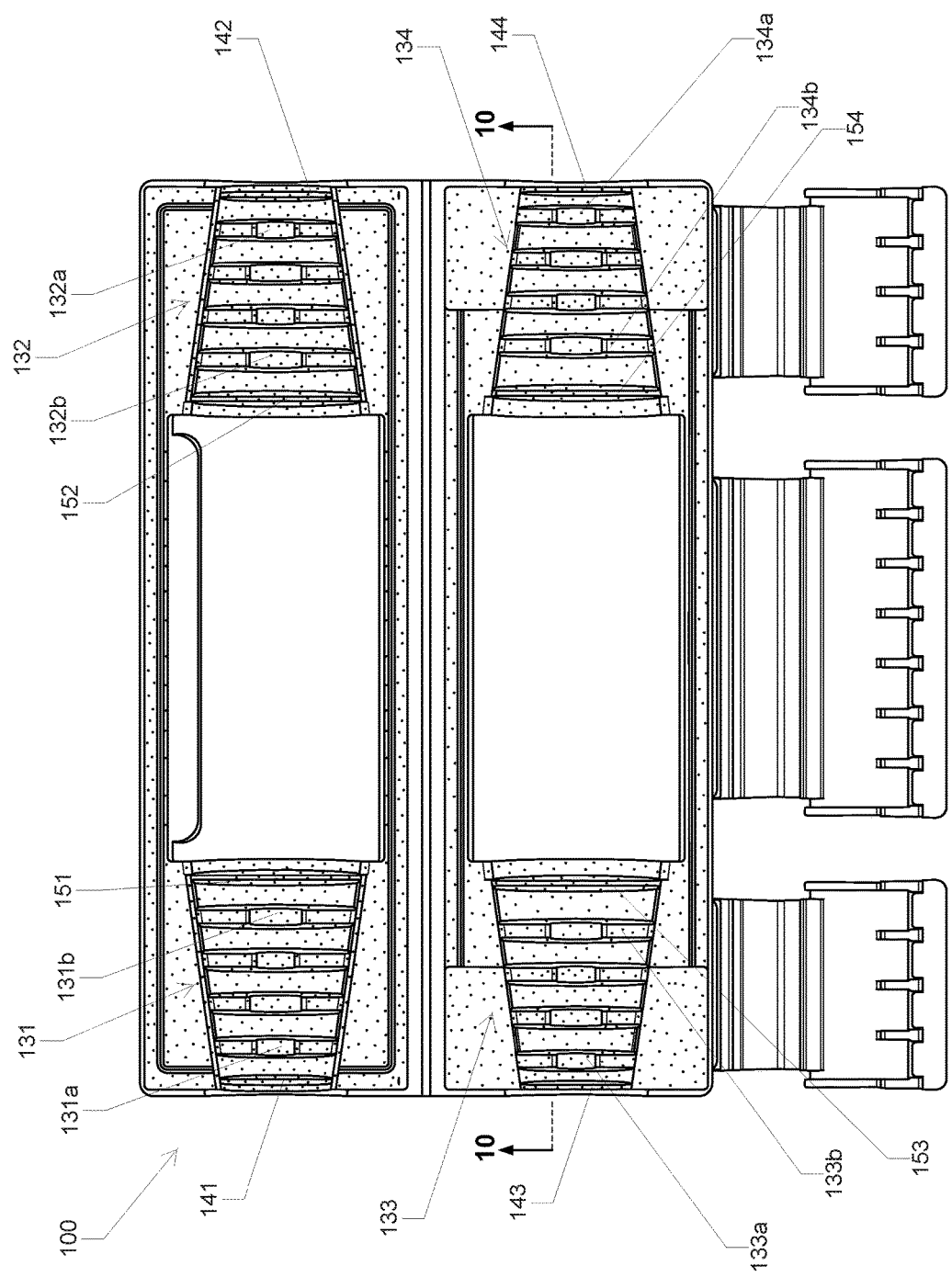
FIG. 5 illustrates a top plan view of the electrical connection covering apparatus in the open position.
Figure 6:
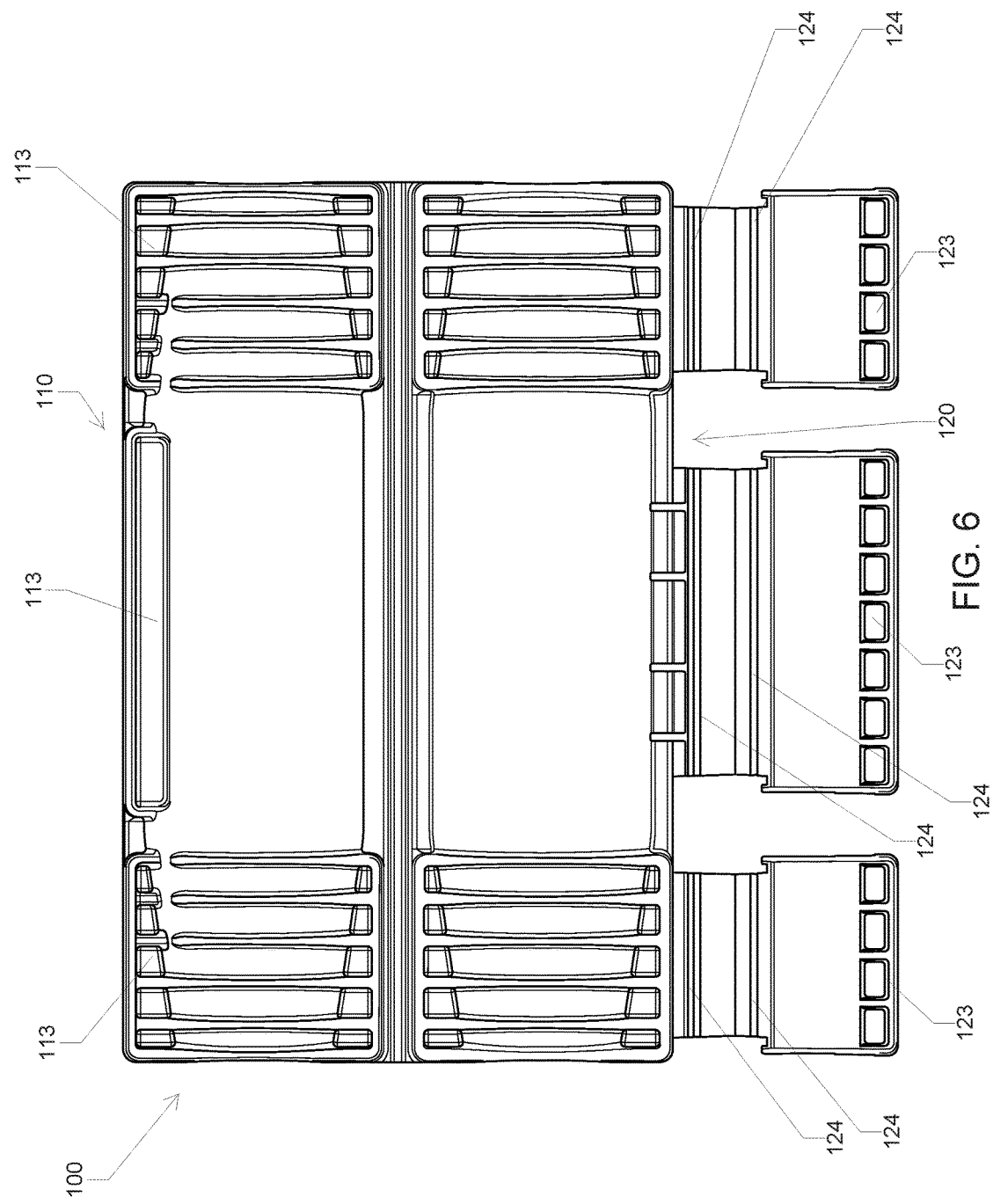
FIG. 6 illustrates a bottom plan view of the electrical connection covering apparatus in the open position.
Figure 7:
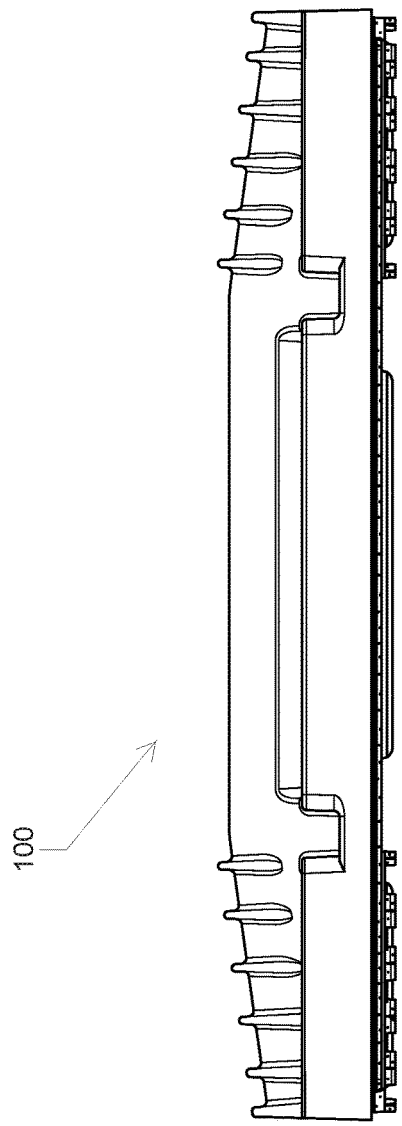
FIG. 7 illustrates a front elevational view of the electrical connection covering apparatus in the open position.
Figure 8:
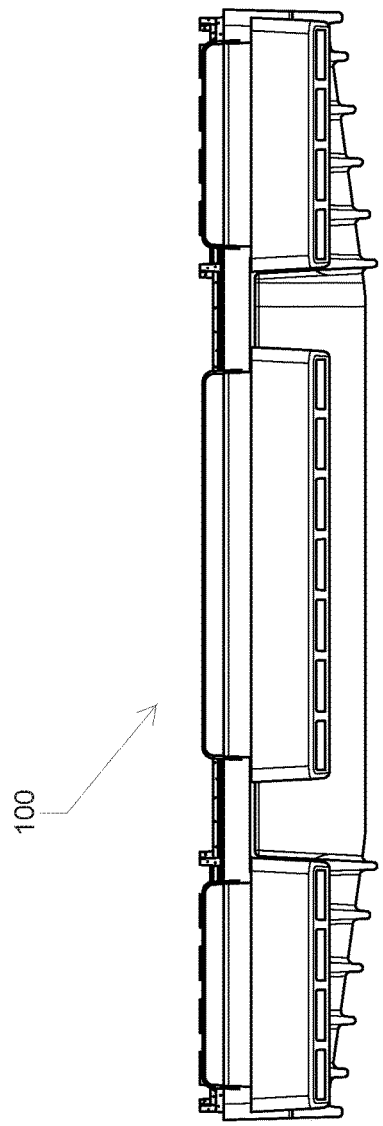
FIG. 8 illustrates a rear elevational view of the electrical connection covering apparatus in the open position.

The housing portion 110 may include a first sealing portion 111 proximate to one end of the housing portion 110 (e.g., the left-side end as depicted in FIGS. 4 and 5). The housing portion 110 may further include a second sealing portion 112 proximate to the opposite end of the housing portion 110 (e.g., the right-side end as depicted in FIGS. 4 and 5). Similarly, the housing portion 120 may include a third sealing portion 121 proximate to one end of the housing portion 120 (e.g., the left-side end as depicted in FIGS. 4 and 5). The housing portion 120 may further include a fourth sealing portion 122 proximate to the opposite end of the housing portion 120 (e.g., the right-side end as depicted in FIGS. 4 and 5). Collectively, the first sealing portion 111, the second sealing portion 112, the third sealing portion 121, and the fourth sealing portion 122, may be referred to as sealing portions 111, 112, 121, 122. The sealing portions 111 and 112 may be connected by one or more raised sealing portion 135 and/or made of one piece. The sealing portions 121 and 122 may be connected by one or more recessed sealing portion 136 and/or made of one piece.

A plurality of at least one cross-wise portion(s) 131, 132, 133, 134 may be attached to, and extend across, the interior surface of respective housing portions 110, 120. The word attached means directly or indirectly attached, such as directly attached to housing portions 110, 120 or attached to the sealing portions 111, 112, 121, 122, which are in-turn attached to housing portions 110, 120. Alternatively, the cross-wise portion(s) 131, 132, 133, 134 may be attached to, and extend across, respective sealing portions 111, 112, 121, 122.

Cross-wise portion(s) 131 may include one or more cross-wise portions 131. In the embodiment shown in the FIGS, there are four cross-wise portions 131, although more or less are possible. Cross-wise portion(s) 132 may include one or more cross-wise portions 132. In the embodiment shown in the FIGS, there are four cross-wise portions 132, although more or less are possible. Cross-wise portion(s) 133 may include one or more cross-wise portions 133. In the embodiment shown in the FIGS, there are four cross-wise portions 133, although more or less are possible. Cross-wise portion(s) 134 may include one or more cross-wise portions 134. In the embodiment shown in the FIGS, there are four cross-wise portions 134, although more or less are possible.

The cross-wise portion(s) 131, 132, 133, 134 may each include a material that is more elastic and/or compressible than a material used for the housing portions 110, 120. The properties of elasticity and compressibility of the cross-wise portion(s) 131, 132, 133, 134 assist to form a seal around the electrical cables that enter and exit the internal hollow region of the apparatus 100.

Cross-wise portion(s) 131, 132, 133, 134 may each have an upper and lower region, although these may be inverted according to the arrangement on or in the apparatus 100. The upper region of cross-wise portion(s) 131, 132 may be distal to the interior surface of the housing portion 110 and the lower region of cross-wise portion(s) 131, 132 may be proximal to the interior surface of the housing portion 110. Likewise, the upper region of cross-wise portion(s) 133, 134 may be distal to the interior surface of the housing portion 120 and the lower region of cross-wise portion(s) 133, 134 may be proximal to the interior surface of the housing portion 120.

As is illustrated in FIG. 10, one or more of the cross-wise portion(s) 131, 132, 133, 134 may also be tapered inwardly (may become narrower in thickness) from a given lower region to a given upper region with respect to the interior surface housing portions 110, 120. As a result one or more of the cross-wise portion(s) 131, 132, 133, 134, may have a lateral thickness that is greater at the lower region than at the upper region. The word lateral thickness is understood to mean thickness along a primary axial dimension. Additionally, as illustrated in FIGS. 4-5 and 9, cross-wise portion(s) 131, 132, 133, 134 may each comprise a recess 138 (which may or may not have a constant radius). The recess 138 may be sized to accommodate approximately half of the diameter of a cord Cross-wise portion(s) 131 may have an outer cross-wise portion 131*a* and an inner cross-wise portion 131*b*. Cross-wise portion(s) 132 may have an outer cross-wise portion 132*a* and an inner cross-wise portion 132*b*. Cross-wise portion(s) 133 may have an outer cross-wise portion 133*a* and an inner cross-wise portion 133*b*. Cross-wise portion(s) 134 may have an outer cross-wise portion 134*a* and an inner cross-wise portion 134*b*.

Cross-wise portion(s) 131 may be offset the left-side recess 115 of housing portion 110 along a primary axial dimension. Cross-wise portion(s) 132 may be offset the right-side recess 115 of housing portion 110 along a primary axial dimension. Cross-wise portion(s) 133 may be offset the left-side recess 125 of housing portion 120 along a primary axial dimension. Cross-wise portion(s) 134 may be offset the right-side recess 125 of housing portion 120 along a primary axial dimension. In another embodiment outer cross-wise portion 131*a* and outer cross-wise portion 132*a* may be offset respectively the left-side and right-side recess 115 of housing portion 110 along a primary axial dimension. Likewise, outer cross-wise portion 133*a* and outer cross-wise portion 134*a* may be offset respectively the left-side and right-side recess 125 of housing portion 120 along a primary axial dimension.

A plurality of outer flaps 141, 142, 143, 144 and inner flaps 151, 152, 153, 154 may respectively be attached to, and extend across, the interior surface of housing portions 110 and 120. The outer flaps 141, 142, 143, 144 and inner flaps 151, 152, 153, 154 may each include a material that is more elastic and compressible than a material used for the housing, and which may be the same as the material used for the cross-wise portion(s) 131, 132, 133, 134 and/or sealing portions 111, 112, 121, 122. The properties of elasticity and compressibility of the outer flaps 141, 142, 143, 144 and inner flaps 151, 152, 153, 154 assist to form a seal around the electrical cables that enter and exit the internal hollow region of the apparatus 100. Alternatively, the outer flaps 141, 142, 143, 144 and inner flaps 151, 152, 153, 154 may respectively be attached to, and extend across, sealing portions 111, 112, 121, 122.

Outer flap 141, 142, 143, 144 and inner flap 151, 152, 153, 154 may each have an upper and lower region, although these may be inverted according to the arrangement on or in the apparatus 100. The upper region of outer flaps 141, 142 and inner flaps 151, 152 may be distal to the interior surface of the housing portion 110 and the lower region of outer flaps 141, 142 and inner flaps 151, 152 may be proximal to the interior surface of the housing portion 110. Likewise, the upper region of outer flaps 143, 144 and inner flaps 153, 154 may be distal to the interior surface of the housing portion 120 and the lower region of outer flaps 143, 144 and inner flaps 153, 154 may be proximal to the interior surface of the housing portion 120.

The cross-wise portion(s) 131, 132, 133, 134, outer flaps 141, 142, 143, 144, and inner flaps 151, 152, 153, 154 may each project inwardly from the interior surface of the respective housing portions 110, 120 towards or into the interior hollow region.

One or more of the sealing portions 111, 112, 121, 122 may contain a recess 139 that may be shaped like a half of a funnel (which may or may not have a constant radius for a given cross-sectional slice of the "funnel"). Cross-wise portion(s) 131 may be attached to, sit in, and/or extend across recess 139 of sealing portion 111; cross-wise portion(s) 132 may be attached to, sit in, and/or extend across recess 139 of sealing portion 112; cross-wise portion(s) 133 may be attached to, sit in, and/or extend across recess 139 of sealing portion 121; and cross-wise portion(s) 134 may be attached to, sit in, and/or extend across recess 139 of sealing portion 122. In one embodiment, each of the cross-wise portion(s) 131, 132, 133, 134 has a varying width to accommodate the half-funnel shape of recess 139. In this embodiment, recess 139 gets narrower proximate the recesses 115 and 125 of the housing portions 110 and 120. As a result, the width of each cross-wise portion 131, 132, 133, 134 gets smaller as they approach the recesses 115 and 125 in the housing portions 110 and 120. Alternatively, the recess 139 may have any other suitable profile—e.g., rectangular, triangular, ovate, etc. If recess 139 is of a different shape such as a half-cylinder or half-prism then the cross-wise portion 131, 132, 133, 134 may be shaped accordingly to accommodate the shape of recess 139.

In alternative embodiment, the cross-wise portion(s) 131, 132 may be attached or adhered directly to the housing portion 110 (e.g., the interior surface of the housing portion 110). Similarly, edges of the cross-wise portion(s) 133, 134 may be attached to the housing portion 120 (e.g., the interior surface of the housing portion 120). For example, the edges of the cross-wise portion(s) 131, 132, 133, 134 may be adhered to the housing portions 110, 120 through an over-molding process. A thermal bond may be used (e.g., ultrasonic bonding or friction welding). Channels, grooves, or other irregularities in the housing portions 110, 120 may be used to improve adherence of the cross-wise portion(s) 131, 132, 133, 134 to the housing portions 110, 120 during the over-molding process. Glues or epoxies may also be used. In such an embodiment, the shape of the cross-wise portion(s) 131, 132, 133, 134 may be determined by the space defined by the interior surface of housing 110, 120—resulting in cross-wise portion(s) 131, 132, 133, 134 having an even or varying width.

The recesses 139 of the sealing portions 111, 121, and 112, 122 may together form a receiving area to accommodate a cable of an electrical cord. When the housing portions 110, 120 are mated or engaged, the two half-funnel recesses 139 of sealing portions 111, 121 may form together a funnel-shaped receiving area. Likewise, the half-funnel recesses 139 of the sealing portions 112, 122 may also form together a receiving area to accommodate a cable of another electrical cord. The receiving areas may have other shapes, such as a tube-like shape. In another embodiment, the combination of cross-wise portion(s) 131, 132, 133, 134 and/or outer flaps 141, 142, 143, 144, and/or inner flaps 151, 152, 153, 154 may form a receiving area to accommodate a cable of an electrical cord.

In one embodiment the outer flap 141 and inner flap 151 may each be attached to sealing portion 111; outer flap 142 and inner flap 152 may each be attached to sealing portion 112; outer flap 143 and inner flap 153 may each be attached to sealing portion 121; and outer flap 144 and inner flap 154 may each be attached to sealing portion 122. In such an embodiment, outer flaps 141, 142, 143, 144 may each be positioned at or proximate to an outer end of a given recess 139. Moreover, the inner flaps 151, 152, 153, 154 may each be positioned at or proximate to an inner end of a given recess 139. The outer flaps 141, 142, 143, 144 may be visible when through the aperture created by recesses 115 and 125 when housing portions 110 and 120 are mated.

In an alternative embodiment, the outer flaps 141, 142 and inner flaps 151, 152 may be attached or adhered directly to the housing portion 110 (e.g., the interior surface of the housing portion 110). Similarly, the outer flaps 143, 144 and inner flaps 153, 154 may be attached or adhered directly to the housing portion 120 (e.g., the interior surface of the housing portion 120). For example, the edges of outer flaps 141, 142, 143, 144 and inner flaps 151, 152, 153, 154 may be adhered to the housing portions 110, 120 through an over-molding process. Glues or epoxies may also be used. In such an embodiment, the shape of the outer flaps 141, 142, 143, 144 and/or inner flaps 151, 152, 153, 154 may be determined by the space defined by the interior surface of housing 110, 120—resulting in outer flaps 141, 142, 143, 144 and/or inner flaps 151, 152, 153, 154 having an even or varying width. Outer and/or inner flaps may be thinner along a primary axial dimension than the cross-wise portion(s) 131, 132, 133, 134.

When the housing portions 110, 120 are mated with each other, one or more of the cross-wise portion(s) 131 may contact a corresponding one or more of the cross-wise portion(s) 133. Likewise, one or more of the cross-wise portion(s) 132 may contact a corresponding one or more of the cross-wise portion(s) 134. Moreover, when the housing portions 110, 120 are mated with each other, outer flap 141 may contact a corresponding outer flap 143. Likewise, outer flap 142 may contact a corresponding outer flap 144. Similarly, inner flap 151 may contact a corresponding inner flap 153. Likewise, inner flap 152 may contact a corresponding inner flap 154. Contact means contact of a top surface and/or a lateral side surface of cross-wise portion(s) 131, 132, 133, 134 and/or outer flaps 141, 142, 143, 144 and/or inner flap 151, 152, 153, 154.

In the example illustrated in FIG. 11, the upper region of the cross-wise portion(s) 131 may be offset from the upper region of opposing cross-wise portion(s) 133 along a primary axial dimension. Likewise, the one or more cross-wise portion(s) 132 may be offset from the one or more cross-wise portion(s) 134 along a primary axial dimension. The cross-wise portion(s) 131, 132, 133, 134 may be offset respectively in such a way that when the housing portions 110, 120 are mated, at least one lateral side of one or more cross-wise portion(s) 131 contacts at least one lateral side of one or more cross-wise portion(s) 133. Likewise, at least one lateral side of one or more cross-wise portion(s) 132 may contact at least lateral one side of one or more cross-wise portion(s) 134.

Similarly, the upper region of the outer flap 141 may be offset from the upper region of the outer flap 143 along a primary axial dimension, and the upper region of the outer flap 142 may be offset from the upper region of the outer flap 144 along a primary axial dimension. Likewise, the upper region of the inner flap 151 may be offset from the upper region of the inner flap 153 along a primary axial dimension, and the upper region of the inner flap 152 may be offset from the upper region of the inner flap 154 along a primary axial dimension. The outer flaps 141, 142, 143, 144 and/or inner flaps 151, 152, 153, 154 may be offset respectively in such a way that that when the housing portions 110, 120 are mated, at least one lateral side of the outer flap 141 contacts at least one lateral side of outer flap 143, at least one lateral side of outer flap 142 contacts at least one lateral side of outer flap 144, at least one lateral side of inner flap 151 contacts at least one lateral side of inner flap 153, and at least one lateral side of inner flap 152 contacts at least one lateral side of inner flap 154.

When the housing portions 110, 120 are mated with each other, the offset positioning of cross-wise portion(s) 131, 132, 133, 134 and/or outer flaps 141, 142, 143, 144 and/or inner flaps 151, 152, 153, 154 as described above, may effectively seal the funnel shaped receiving area formed by recesses 139. Moreover, the offset positioning of cross-wise portion(s) 131, 132, 133, 134 and/or outer flaps 141, 142, 143, 144, and/or inner flaps 151, 152, 153, 154, may form respective enclosed compartments within the receiving area formed by recesses 139 when housing portions 110, 120 are mated or closed. Alternatively, the offset positioning of cross-wise portion(s) 131, 132, 133, 134 and/or outer flaps 141, 142, 143, 144, and/or inner flaps 151, 152, 153, 154, may form respective compartments between one another if these components are attached directly to the interior surface of the housing portions 110 and 120.

In one embodiment, the cross-wise portion(s) 132, 134 are deflected laterally by cross-wise portion(s) 131, 133; outer flaps 142, 144 are deflected laterally by outer flaps 142, 143; and/or inner flaps, 152, 154 are deflected laterally by inner flaps, 151, 153. Deflected laterally means deflected along a primary axial dimension. In another embodiment, cross-wise portion(s) 131, 132, 133, 134 are deflected laterally by each other; outer flaps 141, 142, 143, 144 are deflected laterally by each other; and inner flaps 151, 152, 153, 154 are deflected laterally by each other.

In the example illustrated in FIGS, the contact between cross-wise portion(s) 131, 132, 133, 134, and/or outer flaps 141, 142, 143, 144, and/or inner flaps 151, 152, 153, 154, and/or resulting receiving areas and/or respective compartments may assist in forming seal(s) around the electrical cables that enter and exit the hollow interior region of the apparatus 100. It should be understood, however, that the cross-wise portion(s) 131, 132, 133, 134, and/or outer flaps 141, 142, 143, 144, and/or inner flaps 151, 152, 153, 154 may still assist to form seals even if they do not necessarily form a contact between each other when the apparatus 100 is in a closed position.

In one embodiment, when the receiving area formed by the recesses 139 of the sealing portions 111 and 121—and/or formed by cross-wise portion(s) 131, 133, outer flaps 141, 143, and/or inner flaps 151, 153—accommodates a cable of an electrical cord, the recesses 138 in cross-wise portion(s) 131, 133 may stretch around the cord to form a compression seal around the cord. Likewise, when the receiving area formed by the recesses 139 of the sealing portions 112 and 122—and/or formed by cross-wise portion(s) 132, 134, outer flaps 142, 144, and/or inner flaps 152, 154—accommodates a cable of an electrical cord, the recesses 138 in cross-wise portion(s) 132, 134 may stretch around the cord to form a compression seal around the cord. The elasticity and compression properties of sealing portions 111, 112, 121, 122 assist in forming the compression seal around each cable. Moreover, the compression seal around the cord may prevent the cords from slipping in an out of the apparatus 100.

As is illustrated in FIG. 9, the spacing between inner cross-wise portions 131$b$, 133$b$, and/or 132$b$, 134$b$, may create a positive stop for flanges of cord plug and socket housings. Such a spacing may keep the cord connection (of the plug and socket) intact even if there has been pulling. Such a spacing between inner cross-wise portions 131$b$, 133$b$, and/or 132$b$, 134$b$, may be between 4.5" to 4.75." The spacing in a preferred embodiment may be 4.75."

As is illustrated in FIGS. 10 and 11, the cross-wise portion(s) 131, 132, 133, 134, may include a housing material 201 and a sealing material 202. As previously described, the housing material may likewise include plastic (e.g., polyethylene, polypropylene, ABS, polycarbonate, nylon, or the like). Moreover, as previously described, the sealing material, may likewise include a thermoplastic elastomer or include silicone, rubber, ballistic gel, or the like.

As illustrated in FIGS. 1-9, the apparatus 100 is also configured to form seals in an area around the edges of the housing portions 110, 120 when the housing portions 110, 120 are mated or engaged.

The housing portion 110 may have a rim around its edges. A raised sealing portion 135 may be arranged along the rim of housing portion 110. The housing portion 120 may have a rim around its edges. A recessed sealing portion 136 may be arranged along the rim of housing portion 120. The raised sealing portion 135 and recessed sealing portion 136 may be elongate and extend along the rims of the housing portions 110, 120. The raised sealing portion 135 and recessed sealing portion 136 may not cover the outermost edges of the rims of the housing portions 110, 120. The raised sealing portion 135 and recessed sealing portion 136 may include one or more sealing materials as previously described. The raised sealing portion 135 may be integrated with the sealing portions 111 and 112 and the recessed sealing portion 136 may be integrated sealing portions 121 and 122.

When the housing portions 110, 120 are mated with each other, the raised sealing portion 135 may engage with the recessed sealing portion 136 to form a perimeter seal of apparatus 100. The perimeter seal, in addition to the seals around the cords created by sealing portions 111, 121 and 112, 122, and/or separately by cross-wise portion(s) 131, 132, 133, 134 and/or outer flaps 141, 142, 143, 144, and/or inner flaps 151, 152, 153, 154 may assist in inhibiting the penetration of contaminants (e.g., water or moisture) into the inner hollow region of the enclosure of the housing portions 110, 120.

The apparatus 110 may be releasably securable (e.g., capable of being engaged or mated) when in the closed position. For example, the apparatus 100 may include multiple locking features 113, 123. The locking features 113 may be part of the first housing portion 110, and the locking features 123 may be part of the second housing portion 120, or vice versa. The locking features 123 may extend from the exterior surface of the first housing portion 120. The locking features 123 and housing portion 120 may be connected by one or more hinges 124 (such as a living hinge). The locking features 113 may include a recess in the exterior surface of the second housing portion 110.

The locking features 113, 123 may releasably mate with each other. The locking features 113, 123 may be clamping or snapping locking features. The locking features 113, 123 may have different lengths. The locking features 113, 123 may be centrally located (as depicted in FIGS. 1-9) or may be located towards the ends of the housing portions 110, 120. There may be one, two, three, or more sets of the locking features 113, 123. For example, there may be one set in the middle and one set near each of the end of the housing portions 110, 120.

While the invention has been described with reference to certain techniques, it will be understood by those skilled in the art that various changes may be made and equivalents may be substituted without departing from the scope of the invention. In addition, many modifications may be made to adapt a particular situation or material to the teachings of the invention without departing from its scope. For example, the techniques described in the present application may be applicable not only to protecting electrical connections, but may also be useful for plumbing or other applications (e.g., medical applications). For example, the cross-wise portion(s) 131, 132, 133, 134 and/or outer flaps 141, 142, 143, 144 and/or inner flaps 151, 152, 153, 154 may be used to create seals that inhibit the flow of fluids in any application. The seals may be useful for keeping fluids from flowing out of the housing as well as into the housing. Such an arrangement may be used to remedy, for example, a hole in a pipe or other plumbing whereby the seals formed according to the inventive techniques prevent the unrestrained flow of fluids. Therefore, it is intended that the invention not be limited to the particular technique disclosed, but that the invention will include all techniques falling within the scope of the appended claims.

The invention claimed is:

1. An electrical cord connection covering apparatus for covering a connection of a first electrical cord including a plug and a cable with a second electrical cord including a socket and a cable, wherein the electrical cord connection covering apparatus comprises:

a first housing portion including an interior surface, an exterior surface, a first end, and a second end;

a second housing portion configured to mate with the first housing portion and including an interior surface, an exterior surface, a first end, and a second end, wherein when the first housing portion and second housing portion are mated, they form a hollow interior region, a first aperture configured to receive the first electrical cord, and a second aperture configured to receive the second electrical cord;

a first at least one cross-wise portion attached to the interior surface of the first housing portion and proximate the first end of the first housing portion;

a second at least one cross-wise portion attached to the interior surface of the first housing portion and proximate the second end of the first housing portion;

a third at least one cross-wise portion attached to the interior surface of the second housing portion and proximate the first end of the second housing portion; and a fourth at least one cross-wise portion attached to the interior surface of the second housing portion and proximate the second end of the second housing portion;

wherein:

when the first housing portion is mated with the second housing portion:

the third at least one cross-wise portion is deflected laterally by the first at least one cross-wise portion; and the fourth at least one cross-wise portion is deflected laterally by the second at least one cross-wise portion.

2. The electrical cord connection covering apparatus of claim 1, wherein when the first housing portion is mated with the second housing portion:

the first at least one cross-wise portion and the third at least one cross-wise portion are deflected laterally by each other; and the second at least one cross-wise portion and the fourth at least one cross-wise portion are deflected laterally by each other.

3. The electrical cord connection covering apparatus of claim 1, wherein when the first housing portion is mated with the second housing portion:

each of the first at least one cross-wise portion is offset from the first end of the first housing portion along a primary axial dimension;

each of the second at least one cross-wise portion is offset from the second end of the first housing portion along the primary axial dimension;

each of the third at least one cross-wise portion is offset from the first end of the second housing portion along the primary axial dimension; and each of the fourth at least one cross-wise portion is offset from the second end of the second housing portion along the primary axial dimension.

4. The electrical cord connection covering apparatus of claim 1, wherein:

an upper region of the first at least one cross-wise portion is offset from an upper region of the third at least one cross-wise portion along a primary axial dimension; and an upper region of the second at least one cross-wise portion is offset from an upper region of the fourth at least one cross-wise portion along the primary axial dimension.

5. The electrical cord covering apparatus of claim 1, wherein:

each of the first at least one cross-wise portion and third at least one cross-wise portion comprise a recess located to accommodate a portion of the cable of the first electrical cord;

each of the second at least one cross-wise portion and fourth at least one cross-wise portion comprise a recess located to accommodate a portion of the cable of the second electrical cord.

6. The electrical cord connection covering apparatus of claim 1, further comprising:

a raised portion located along a rim of the first housing portion;

a recessed portion located along a rim of the second housing portion; and wherein the raised portion and the recessed portion engage with each other when the first housing portion is mated to the second housing portion.

7. The electrical cord connection covering apparatus of claim 1, wherein:

the first housing portion is connected to the second housing portion by a living hinge.

8. The electrical cord covering apparatus of claim 1, further comprising:

at least one recessed portion in the exterior surface of the first housing portion;

at least one locking portion extending from the exterior surface the second housing portion; and wherein the at least one locking portion engages with the at least one recessed portion when the first housing portion is mated to the second portion.

9. The electrical cord covering apparatus of claim 2, wherein:

the at least one locking portion is connected to the second housing portion by a corresponding at least one living hinge.

10. An electrical cord connection covering apparatus for covering a connection of a first electrical cord including a plug and a cable with a second electrical cord including a socket and a cable, wherein the electrical cord connection covering apparatus comprises:

a first housing portion including an interior surface, an exterior surface, a first end, and a second end;

a second housing portion configured to mate with the first housing portion and including an interior surface, an exterior surface, a first end, and a second end, wherein when the first housing portion and second housing portion are mated, they form a hollow interior region, a first aperture configured to receive the first electrical cord, and a second aperture configured to receive the second electrical cord;

a first at least one cross-wise portion attached to the interior surface of the first housing portion and proximate the first end of the first housing portion;

a second at least one cross-wise portion attached to the interior surface of the first housing portion and proximate the second end of the first housing portion;

a third at least one cross-wise portion attached to the interior surface of the second housing portion and proximate the first end of the second housing portion; and a fourth at least one cross-wise portion attached to the interior surface of the second housing portion and proximate the second end of the second housing portion;

wherein:

an inner one of the first at least one cross-wise portion and an inner one of the second at least one cross-wise portion are spaced apart from each other to prevent the plug of the first electrical cord from separating from the socket of the second electrical cord when the plug and socket are engaged.

11. The electrical cord connection covering apparatus of claim 10, wherein:

the spacing between the inner one of the first at least one cross-wise portion and the inner one of the second at least one cross-wise portion is between 4.5 and 4.75 inches.

12. The electrical cord connection covering apparatus of claim 10, wherein:

the spacing between the inner one of the first at least one cross-wise portion and the inner one of the second at least one cross-wise portion is 4.75 inches.

13. The electrical cord connection covering apparatus of claim 10, wherein when the first housing portion is mated with the second housing portion:

each of the first at least one cross-wise portion is offset from the first end of the first housing portion along a primary axial dimension;

each of the second at least one cross-wise portion is offset from the second end of the first housing portion along the primary axial dimension;

each of the third at least one cross-wise portion is offset from the first end of the second housing portion along the primary axial dimension; and each of the fourth at least one cross-wise portion is offset from the second end of the second housing portion along the primary axial dimension.

14. The electrical cord covering apparatus of claim 10, wherein:

each of the first at least one cross-wise portion and third at least one cross-wise portion comprise a recess located to accommodate a portion of the cable of the first electrical cord;

each of the second at least one cross-wise portion and fourth at least one cross-wise portion comprise a recess located to accommodate a portion of the cable of the second electrical cord.

15. An electrical cord connection covering apparatus for covering a connection of a first electrical cord including a plug and a cable with a second electrical cord including a socket and a cable, wherein the electrical cord connection covering apparatus comprises:

a first housing portion including an interior surface, an exterior surface, a first end, and a second end;

a second housing portion configured to mate with the first housing portion and including an interior surface, an exterior surface, a first end, and a second end, wherein when the first housing portion and second housing portion are mated, they form a hollow interior region, a first aperture configured to receive the first electrical cord, and a second aperture configured to receive the second electrical cord;

a first at least one cross-wise portion attached to the interior surface of the first housing portion and proximate the first end of the first housing portion;

a second at least one cross-wise portion attached to the interior surface of the first housing portion and proximate the second end of the first housing portion;

a third at least one cross-wise portion attached to the interior surface of the second housing portion and proximate the first end of the second housing portion; and a fourth at least one cross-wise portion attached to the interior surface of the second housing portion and proximate the second end of the second housing portion;

wherein:
each of the first at least one cross-wise portion, second at least one cross-wise portion, third at least one cross-wise portion, and fourth at least one cross-wise portion are tapered inwardly with respect to the interior surface of the first and second housing portions, such that a lateral thickness of a given cross-wise portion is greater at a lower region of said cross-wise portion than at an upper region of said cross-wise portion.

16. The electrical cord connection covering apparatus of claim 15, wherein: an upper region of the first at least one cross-wise portion is offset from an upper region of the third at least one cross-wise portion along a primary axial dimension; and an upper region of the second at least one cross-wise portion is offset from an upper region of the fourth at least one cross-wise portion along the primary axial dimension.

17. The electrical cord connection covering apparatus of claim 16, wherein when the first housing portion is mated with the second housing portion: the first at least one cross-wise portion abuts the third at least one cross-wise portion; and the second at least one cross-wise portion abuts the fourth at least one crosswise portion.

18. The electrical cord connection covering apparatus of claim 17, wherein when the first housing portion is mated with the second housing portion: a lateral side of the first at least one cross-wise portion abuts a lateral side of the third at least one cross-wise portion; and a lateral side of the second at least one cross-wise portion abuts a lateral side of the fourth at least one cross-wise portion.

19. An electrical cord connection covering apparatus for covering a connection of a first electrical cord including a plug and a cable with a second electrical cord including a socket and a cable, wherein the electrical cord connection covering apparatus comprises:

a first housing portion including an interior surface, an exterior surface, a first end, and a second end;

a second housing portion configured to mate with the first housing portion and including an interior surface, an exterior surface, a first end, and a second end, wherein when the first housing portion and second housing portion are mated, they form a hollow interior region, a first aperture configured to receive the first electrical cord, and a second aperture configured to receive the second electrical cord;

a first at least one cross-wise portion attached to the interior surface of the first housing portion and proximate the first end of the first housing portion;

a second at least one cross-wise portion attached to the interior surface of the first housing portion and proximate the second end of the first housing portion;

a third at least one cross-wise portion attached to the interior surface of the second housing portion and proximate the first end of the second housing portion; and a fourth at least one cross-wise portion attached to the interior surface of the second housing portion and proximate the second end of the second housing portion;

wherein:
the first housing portion and second housing portion comprise a housing material; and
each of the first at least one cross-wise portion, second at least one cross-wise portion, third at least one cross-wise portion, and fourth at least one cross-wise portion comprise a sealing material;
wherein the sealing material is more compressible than the housing material; and
the sealing material is more elastic than the housing material.

20. An electrical cord connection covering apparatus for covering a connection of a first electrical cord including a plug and a cable with a second electrical cord including a socket and a cable, wherein the electrical cord connection covering apparatus comprises: a first housing portion;

a second housing portion that mates with the first housing portion; at least one cross-wise portion attached to an interior surface the first housing portion; and at least one opposing cross-wise portion attached to an interior surface of the second housing portion; wherein a lateral side of the at least one cross-wise portion abuts a lateral side of the at least one opposing cross-wise portion when the first housing portion is mated with the second housing portion, wherein: the at least one cross-wise portion and the opposing at least one crosswise portion are each tapered inwardly with respect to the interior surface of the first and second housing portions, such that a lateral thickness of a given cross-wise portion is greater at a lower region of said cross-wise portion than at an upper region of said cross-wise portion.

21. The electrical cord connection covering apparatus of claim 20, wherein:
an upper region of the cross-wise portion attached of the first housing portion is offset from an upper region of opposing cross-wise portion of the second housing portion along a primary axial dimension.

22. The electrical cord covering apparatus of claim 20, wherein: the at least one cross-wise portion and the opposing at least one cross-wise portion each comprise a recess sized to accommodate a portion of the cable of the first electrical cord.

* * * * *